(12) United States Patent
Erb

(10) Patent No.: US 9,062,644 B2
(45) Date of Patent: Jun. 23, 2015

(54) PRESSURE-LIMITING VALVE

(75) Inventor: Ulrich Erb, Köln (DE)

(73) Assignee: VOSS AUTOMOTIVE GMBH, Wipperfürth (DE)

( * ) Notice: Subject to any disclaimer, the term of this patent is extended or adjusted under 35 U.S.C. 154(b) by 173 days.

(21) Appl. No.: 13/547,403

(22) Filed: Jul. 12, 2012

(65) Prior Publication Data

US 2013/0306166 A1 Nov. 21, 2013

(30) Foreign Application Priority Data

May 16, 2012 (DE) .......................... 10 2012 104 286

(51) Int. Cl.

| | |
|---|---|
| F16K 17/14 | (2006.01) |
| F02M 63/00 | (2006.01) |
| F02M 37/00 | (2006.01) |
| F16K 17/04 | (2006.01) |
| F16K 17/08 | (2006.01) |
| F16K 15/02 | (2006.01) |
| F16K 17/06 | (2006.01) |

(52) U.S. Cl.
CPC ......... *F02M 63/005* (2013.01); *F02M 37/0029* (2013.01); *F16K 17/0466* (2013.01); *F16K 17/082* (2013.01); *F02M 63/0056* (2013.01); *F16K 15/025* (2013.01); *F16K 17/065* (2013.01)

(58) Field of Classification Search
CPC .............. F16K 17/0446; F16K 17/082; F02M 63/0056; F02M 63/005; F02M 37/005
USPC ............ 137/538, 540, 514.3, 514.7, 469, 494
See application file for complete search history.

(56) References Cited

U.S. PATENT DOCUMENTS

| | | | | |
|---|---|---|---|---|
| 1,804,897 | A | * | 5/1931 | Thomas ........................ 137/469 |
| 2,594,626 | A | | 9/1946 | Earle |
| 3,626,975 | A | * | 12/1971 | Bobst et al. .................... 137/484 |
| 6,571,822 | B2 | * | 6/2003 | Neugebauer et al. ......... 137/538 |
| 8,162,623 | B2 | | 4/2012 | Aritomi et al. |
| 2006/0151031 | A1 | * | 7/2006 | Krenzer et al. ............... 137/538 |

FOREIGN PATENT DOCUMENTS

| | | |
|---|---|---|
| DE | 43 11 856 | 10/1994 |
| EP | 0 466 081 A1 | 1/1992 |

* cited by examiner

*Primary Examiner* — Kevin Lee
*Assistant Examiner* — P. Macade Nichols
(74) *Attorney, Agent, or Firm* — Brinks Gilson & Lione

(57) ABSTRACT

A pressure limiting valve having a housing head and a housing jacket. An axial inlet opening in a valve base is axially separated from an outlet opening. An inner valve seat connects to the inlet opening and an axially mobile valve piston is arranged to produce a closing force against a pressure (p) acting at the inlet opening. The valve body is formed as a stepped piston with a first step having a first surface that is acted upon in the axial direction by the pressure. The stepped piston has a first axial length that defines a first peripheral throttling gap with an inner surface (of the valve seat. The stepped piston also has a second step with a second surface that may be acted upon in the axial direction by the pressure, and together with the first surface ($A_1$), forms a total pressure surface. The second step has a second axial length ($L_2$) that defines a second peripheral throttling gap.

15 Claims, 6 Drawing Sheets

PRESSURE-LIMITING VALVE

BACKGROUND

1. Field of the Invention

The present invention relates to a pressure limiting valve, in particular for arrangement in a return pipe of a common-rail system of an internal combustion engine with a valve housing, which features a housing head and a hollow cylindrical housing jacket in which there is an axial inlet opening and at least one radial outlet opening axially separated from the inlet opening in a valve base of the valve housing, whereby an inner valve seat for a valve body connects in the valve base to the inlet opening, and whereby an axially mobile valve piston is arranged between the valve body and a closing spring, which produces a closing force against the pressure acting at the inlet opening.

2. Related Technology

Such pressure limiting valves are used in fuel return pipes of so-called common-rail injection systems of internal combustion engines. In common-rail fuel injection—also called accumulator injection—a high-pressure pump raises the fuel to a high pressure level. The pressurized fuel fills a pipe system, the accumulator, which is continuously under pressure during engine operation. The system features a joint pressure pipe, the so-called rail, for several injectors. Fuel is delivered via the pressure pipe at high pressure, and injected via the injectors in doses into the internal combustion engine. The power of the high-pressure pipe is hereby arranged such that at any time and in any operating state, more fuel can be delivered than the engine requires. The fuel that is not injected is in each instance returned via the return pipe to a section pipe of the fuel pump or to the tank. Here it is generally necessary to maintain a specific minimum pressure within a range of up to approximately 10 bar in the low-pressure range of the injectors. For this purpose, a pressure limiting valve of the described type, which is frequently also called a pressure retention valve, as is known in similar form from DE 43 11 856 A1, can be mounted in the return. This valve fulfills the described tasks of maintaining the pressure of the fuel at a defined value, or more specifically limiting it to this defined value.

In practical use, it has been demonstrated, in particular for a valve with a spherical valve element, as described in DE 43 11 856 A1, that under specific operating conditions, there may be damage to or even total failure of the pressure limiting valve.

It is the purpose of this invention to improve a pressure limiting valve of the described, generic type with regard to operating safety, and thus avoid damage or even total failure.

SUMMARY

In accordance with the teachings of the present invention, this is achieved in that the valve body is configured as a stepped piston, which in its first step features on its side facing the inlet opening a first surface that can be acted upon in the axial direction by the pressure, as well as a first axial length, through which, in closed position, it forms, with its outside surface, a peripheral throttling gap featuring a first gap width with an inner surface of the valve seat, and which in its second step features a second surface that can be acted upon in an axial direction by the pressure, which together with the first surface forms a total pressure surface, whereby in the second step, by means of a second axial length, a second peripheral throttling gap with a second gap width is formed between the outer surface of the stepped piston and an inner surface of the housing jacket.

In the pressure limiting valve as described herein, the two throttling gaps effect hydraulic damping of movement of the valve piston in the valve closure direction. Here the embodiment of the pressure limiting valve is based on the understanding that the damage identified in the known valves may be attributed to the abrupt movements of the, for example, known spherical valve body caused by excitations in the injection cycle of the internal combustion engine, and indeed, in particular to the rapid and abrupt closing movements. These abrupt movements are effectively damped by the valve herein in that above all the spring-loaded valve piston in its closing movement are braked by the hydraulic resistance, which is comprised of a hydraulic partial resistance of the first throttling gap and a hydraulic partial resistance of the second throttling gap. With the pressure limiting valve according hereto, not only can damping of the axial movement be achieved in an advantageous manner, but, in contrast to valves with a spherical valve body, movement of the valve body in the radial direction, which is particularly damaging during pressure fluctuations, can be prevented.

Apart from its robustness against pressure pulses and a low damage susceptibility to fluctuations in volume flow running through the valve, the valve also features a high contamination resistance due to the narrow throttling gap and the different pressure surfaces, as well as potential variation of the total hydraulic resistance in throttling by means of flexible absolute dimensioning of the hydraulic partial resistances of the two throttling gaps, and by means of optimizable setting of the ratio of the hydraulic partial resistances to one another—a multistage control stage that is also easily adaptable to various usage applications.

Thus in particular in a first operating stage, in which both throttling gaps and the smaller pressure surface of the first step of the valve element are active, a rapid pressure increase can be achieved with a minimal flow rate, and in a second operating stage, in which a steadily growing flow channel is opened up between the valve element and the housing jacket, and the lower total pressure surface is active, a slower pressure increase can be achieved with a growing flow rate. This may be attributed to the fact that due to the different-sized pressure-affected surfaces in the two operating stages, different-size pressure forces are advantageously produced in the operating stages to act against the closing force of the closing springs.

BRIEF DESCRIPTION OF THE INVENTION

DETAILED DESCRIPTION

Figures 1, 2:
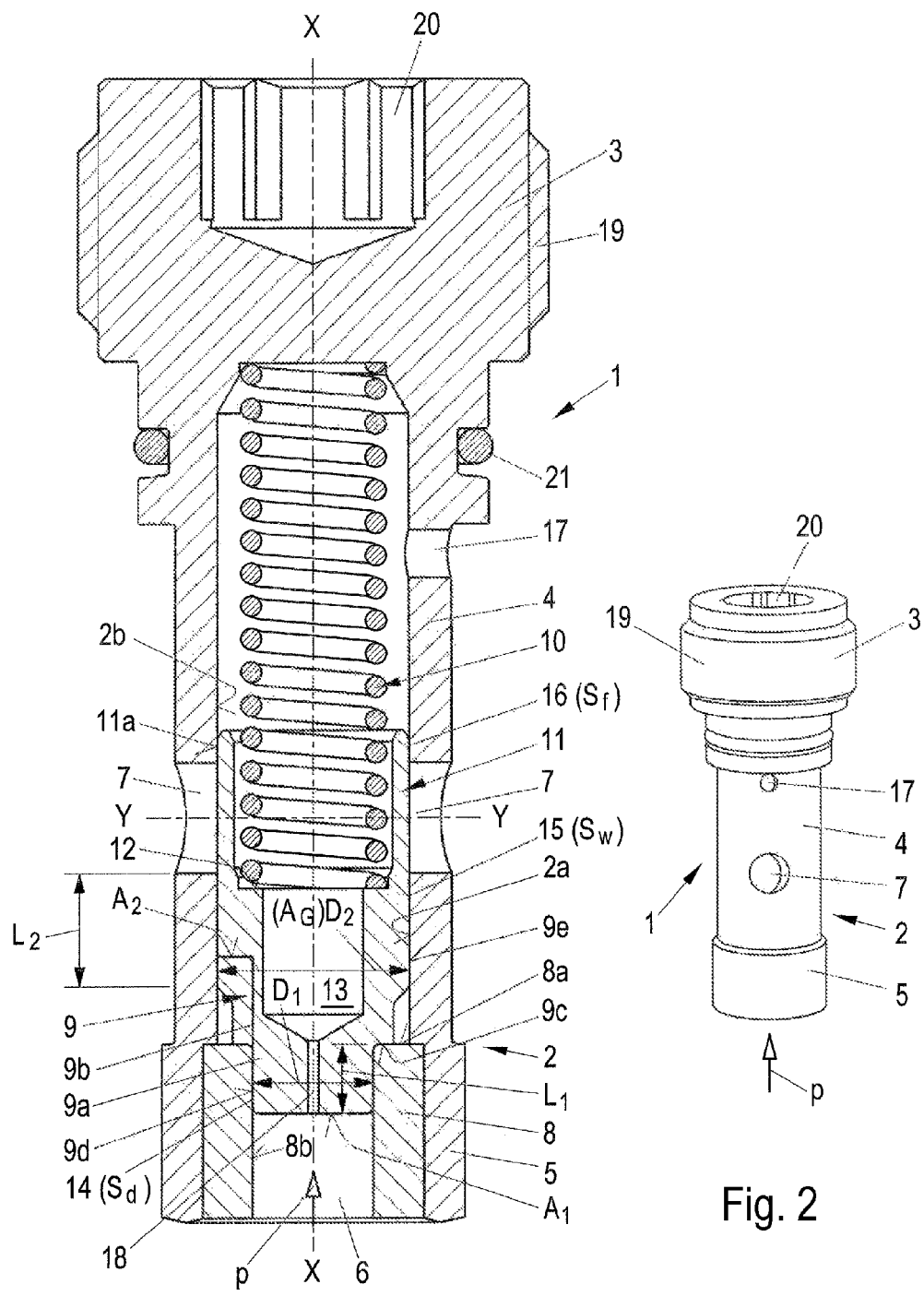
FIG. 1 shows a pressure limiting valve in accordance with the principles of the present invention in axial section in a closed position
FIG. 2 shows a perspective view of a pressure limiting valve in accordance with the principles of the invention on a smaller scale than in FIG. 1

As regards the following description, it is expressly emphasized that the invention is not limited to the exemplary embodiments, and at the same time, is not limited to all or a plurality of features of the described feature combinations; but rather that each specific partial feature of each exemplary embodiment, even seen in isolation from all other partial features described in association therewith, are of inventive significance in themselves and in combination with any other features of another exemplary embodiment.

In the various figures of the drawing, the same parts are always provided with the same reference signs, and are therefore as a rule only described once.

As seen initially in FIGS. 1 and 2, but also in FIGS. 3 to 5 and 7, a pressure limiting valve 1 in accordance with the principles of the present invention, which can in particular be arranged in a return pipe of a common-rail system of an internal combustion engine, features a valve housing 2. The valve housing 2 comprises a housing head 3, which is not shown in FIGS. 3 to 5, as well as a hollow cylindrical housing jacket 4 with a valve base 5.

The valve base 5 of the valve housing 2 contains an inlet opening 6 for a fluid medium, in particular for a liquid fuel, opened in the axial direction X-X.

Axially separated from the inlet opening 6 in the housing jacket 4 there is at least one outlet opening 7, in particular one open in the radial direction Y-Y, whereby the cross-sectional views in the drawing in the preferred embodiment in each case show two outlet openings 7 lying diametrically opposite one another.

In the valve base 5, an inner valve seat 8 for a valve element 9 connects to the inlet opening 6. This valve seat 8 is preferably formed by an annular insert secured in the valve base 5 of the valve housing 2, and preferably features a cylindrical inner surface 8b. By means of a different material selection for the insert as well as for the valve housing 8, a higher dimensional stability in the region of the valve seat 8 can in particular be assured for the function of the valve 1.

An axially mobile, hollow cylindrical valve piston 11 can be arranged between the valve element 9 and a closing spring 10, which is configured as a coil spring and produces a closing force against the pressure p acting at the inlet opening 6. The valve piston is configured as a single-piece valve insert element together with the valve element 9 in a less expensive manufacturing process. It features a step bore on the inside, containing a rotating circulating piece 12 for support of the closing spring 10, and a blind hole 13 ending in the region of the valve element 9.

Preferably a steel designated 1.4031 (per DIN EN 10 027) or X5CrNi18-10 (per DIN EN 10 088) may be used as the spring material, and the material for the housing jacket 4 should be a nitride carbon steel designated 1.0718 or 11SMnPb30+C or 1.0715 or 1.7139 or 16MnCrS5. The valve element 9 and the valve piston 11 can preferably be made from a hardened steel designated 1.403+S or X46Cr13 and the valve seat 8 preferably from hardened steel with the designation 1.4031 or X5CrNi18-10.

The valve 1 can thus be used in a fuel return pipe, not shown, in such a way that it is acted upon via the inlet opening 6 by the pressure p, which prevails within the return pipe, and preferably is built up by a low-pressure pump, not shown. Here the valve 1 is designed with regard to the closing force of the closing spring 10 such that it opens, starting with a specific pressure p, in that the valve element 9 rises from the valve seat 8 against the closing force. The pressure p then continues to act on the valve piston 11, so that the latter is likewise displaced against the closing force until it at least partially uncovers the outlet opening 6, thus opening it. For closure, the valve piston 11 acts on the valve element 9 in order to push the latter into the valve seat 8, and thus close the inlet opening 6.

With the inventive pressure limiting valve 1, as already mentioned, in a preferred embodiment, the or each of the preferably two diametrically opposite outlet openings 7 is arranged as a radial opening in the housing jacket 4 of the valve housing 2. Here the outlet openings 7 and the valve piston 11 are arranged relative to one another in such a way that the valve piston 11 uncovers the outlet openings 7 in an open position (FIG. 5), at least in sections, in the direction of the inlet opening 6, and at least in a closed position (FIG. 1), but also covers it, like a slider, in intermediate positions (FIGS. 3 and 4) between the open and closed position.

Figure 7:
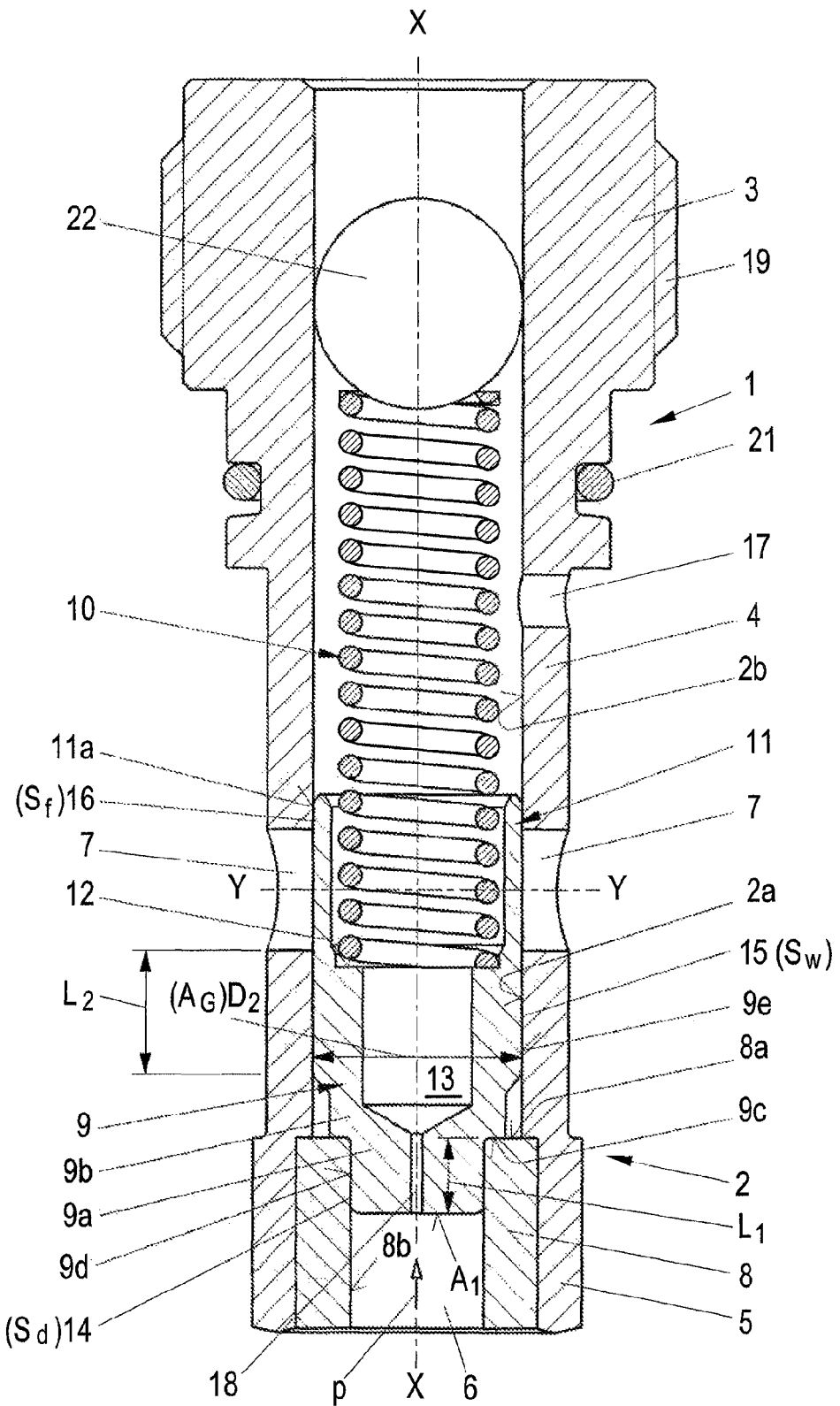
FIG. 7 shows a further embodiment of a pressure limiting valve in accordance with the principles of the invention in axial section in a closed position.

In accordance with the principles of the present invention, the valve element 9 is configured as a stepped piston with two steps 9a and 9b, which are separated from one another by a peripheral annular heel 9c. The heel 9c in the closed position of the valve 1 shown in FIGS. 1 and 7 is stopped by the inner front surface 8a of the valve seat, which is axially turned toward it thus limiting the axial motion of the valve element 9 in the direction of action of the spring 10 and counter to the direction of action of the pressure p.

In its first step 9a, the valve body 9 features on its side facing the inlet opening 6 a first surface $A_1$ that may be acted upon in the axial direction X-X by the pressure p. This surface $A_1$ is this circular front surface of the valve body 9 in the presented embodiment, whereby its surface area is determined by its diameter $D_1$.

Further, in its first step 9a, the valve body 9 features a length $L_1$, through which it forms, with its outer surface 9d, a peripheral throttling gap 14 featuring a gap width $S_d$ with the inner surface 8b of the valve seat 8 in its own or the close position of the valve 1. The gap 14 in the inventive valve 1 creates a hydraulic partial resistance of a hydraulic throttle that is advantageously integrated into the valve 1 for damping the movement of the valve element 9 and the valve piston 11, or for damping the movement of the valve insert element formed as a single piece from these parts 9 and 11.

In its second step 9b, the valve body 9 features a second surface $A_2$, which may be acted upon in the axial direction X-X by the pressure p, said surface, together with the first surface $A_1$, viewed in a cross-section perpendicular to the longitudinal axis X-X, forming a circular total pressure surface $A_G$ in this embodiment. This second surface $A_2$, which may be acted upon in the axial direction X-X by the pressure, is annular in the shown embodiment, whereby its surface area is determined by the difference between the maximum outer diameter $D_2$ of the valve body 9 in its second step 9b and the diameter $D_1$ of the circular frontal surface of the valve body 9. It is indicated in the figures by a half-page, bold radial projection line, and marked with the reference sign $A_2$. The circular total surface $A_G$ is formed solely by the maximum outside diameter $D_2$ of the valve body 9, its reference sign $A_G$ being placed in the drawing, in order to illustrate this circumstance, in parentheses behind the reference sign $D_2$ for the maximum outer diameter. This outer diameter $D_2$ is identical to that of the valve piston 11, which thus features an outer cross section $A_2$, which is greater than the outer cross section $A_1$ of the valve element 9 in its first step 9a.

In the second step 9b of the valve body 9, there is a second peripheral throttling gap 15 between an outer surface 9e of the stepped piston and an inner surface 2a of the housing jacket 4, said gap extending across an axial length $L_2$.

Particularly by means of special dimensioning of the lengths $L_1$ and $L_2$, the gap widths $S_d$ and $S_w$, and the diameters $D_1$ and $D_2$ of the two throttling gaps 14 and 15 of the inventive valve 1, for a medium with specific, characteristic properties, such as, in particular, those of a dynamic or kinematic viscosity corresponding to that in the so-called throttling equation known in hydraulics, a desired throttling effect can be set, that is, a specific, in particular a very small ratio of fluid quantity Q delivered per time unit to a pressure difference $\Delta p$ appearing over the entire length of the throttling gaps 14, 15, or a hydraulic total resistance resulting from addition of the two hydraulic partial resistances of the throttling gaps 14 and 15. Provided that, or as long as the total pressure p drops, or as the case may be should drop over the throttling gap 14, 15, the indicated pressure difference $\Delta p$ is identical to the operating pressure p.

Hereby it is preferred that the second throttling gap 15 is designed in length $L_2$, perimeter $\pi^*D_2$, and gap width $S_w$ such that the partial hydraulic resistance effected by it is less than the hydraulic partial resistance of the first throttling gap 14. In this regard, it is noted that the diameters $D_1$ and $D_2$ of the surfaces $A_1$ and $A_2$ are approximately equal to the average diameters $D_1$, $D_2$ of the throttling gaps 14 and 15, as the relative deviations are extremely small.

Here the second throttling gap 15 can preferably feature a smaller gap width $S_w$ than the gap width $S_d$ of the first throttling gap 14. Despite this smaller gap width $S_2$, the throttling gap 15 can still preferably have a lesser throttling effect, and thus a smaller hydraulic partial resistance, than the first throttling gap 14, as the smaller, resistance-increasing gap width can be compensated for by a resistance-reducing smaller length $L_2$ at the closed position of the valve 1 with the likewise resistance-reducing larger diameter $D_2$.

In particular, with this embodiment, with the inventive valve 1, there is, advantageously, a fair approximation of the flow technology characteristic of a sphere used in the known manner as a valve body, but without having to accept the disadvantages of a spherical valve body.

A further peripheral gap 16 with a gap width $S_f$ is located on the side of the valve piston 11 facing the housing head 3, or as the case may be the valve core body formed from the valve body 9 and the valve piston 11, on the side of the inlet opening 6 facing the valve base 5. The gap 16, like the second throttling gap 15, which is located on the side of the inlet opening 6 facing the valve base, is formed between an inner surface of the housing jacket 4 marked here with the reference sign 2b, and the outer surface of the valve piston 11, which is marked here with the reference sign 11a.

The gap width $S_f$ of this gap 16 can preferably be very small and optimally, in terms of manufacturing technology, can be kept exactly as large as the gap width $S_w$ of the second throttling gap 15. Both the second throttling gap 15 and the additional peripheral gap 16 here operate advantageously as the guide gap for the valve piston 11. The second throttling gap 15, with the hydraulic function of throttling—viewed in the flow direction of the fluid—runs here in front of the outlet opening 7, whereas the additional peripheral gap 16, without hydraulic function, runs behind the outlet opening 7. Good control of the piston can thus be achieved due to a small peripheral clearance, whereby the corresponding gap widths $S_w$ and $S_f$ are smaller than the gap width $S_d$ of the first throttling gap 14.

In a further preferred embodiment, the valve housing 2 in its housing jacket 4, in particular close to the head outside the region coverable by the valve pistons 11, can feature at least one radial relief opening 17 so as to allow the opening movement of the valve piston 11, whereby the fluid contained in the space receiving the spring 10 can escape, and in the case of fuel can preferably likewise be returned through the relief opening 17 to a tank.

Here a leak passage can be advantageously integrated into the inventive valve 1 in order to ventilate and/or maintain a target leak volume flow. Such a leak passage can be configured as an external bypass pipe or preferably, as shown, by means of an axially running leak channel 18, configured as a through bore through the front surface $A_1$ of the valve element 9. Here, in particular, the dimensioning should be such that the channel 18 acts as a throttle. Then, in the closed position as well, a leak stream $Q_L$ can flow continuously through the leak channel 18 through the valve element 9, the inner space of the valve piston 11, and the space receiving the spring 10, and then emerge again from the valve housing 2 at the relief opening 17.

The leak channel 18 preferably features a hydraulic resistance that is much smaller than that of the two throttling gaps 14 and 15, and therefore has in itself no significant influence on the operating stage of the throttling gaps 14 and 15. It only becomes relevant when the affect of the throttling gaps 14, 15 is no longer present, and the relation of Q to p is determined by the gap width $S_w$ of the second throttling gap 15 and the leak channel 18.

On its way via the leak channel 18 through the housing jacket 14 of the inventive valve 1 and finally through the relief opening 17, air that is present even in the low-pressure system—during a first filling of the system with fuel, for example in a start-up process of a low-pressure pipe—can advantageously be forced through the valve 1 and out of the system, thus providing venting.

For simple installation in a common-rail system, the valve housing 2 can preferably be configured as a hollow screw with an external threading 19 and a point of force application 20 for a turning tool, said point of force application being located, in particular, in the region of the head, axially opposite to the inlet opening 6, said hollow screw having an outer peripheral seal, as shown in particular in FIGS. 1 and 2.

By means of the described inventive configuration, an advantageous mode of operation is achieved, which is explained below for the opening process of the valve 1 with reference to the FIGS. 1, 3, 4 and 5 and with particular reference to FIG. 6, which shows the dependence of the flow rate Q per unit of time through the valve on the pressure p acting at the inlet opening 6.

Figure 6:
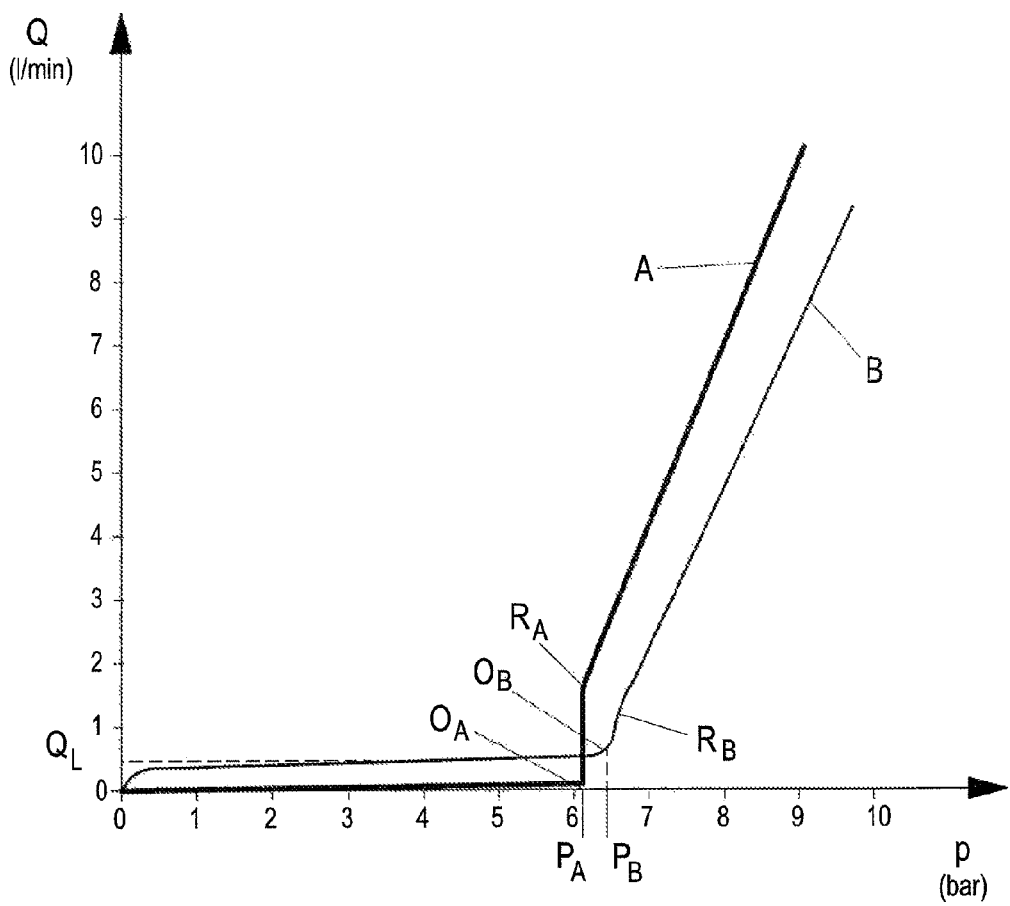
FIG. 6 shows an exemplary diagram visualization comparing the operating stage, characterized by the dependence of a flow rate through the valve on the pressure acting at the inlet opening for two embodiments of the pressure limiting valve in accordance with the principles of the present invention.

Proceeding from the closed position in accordance with FIG. 1, in which initially a pressure p is present, which acts in the inlet opening 6 on the front surface $A_1$ of the valve element p and which has a value of zero, FIG. 6 illustrates the regulating action of the inventive valve 1 for two different embodiments A and B up to a maximum pressure of approximately 10 bar. The curve marked with the reference sign A here refers to an embodiment without the leak channel 18, while the curve B refers to an embodiment with the leak channel 18.

In the closed position at low pressure p, the valve body 9 is held in the valve seat 8 by the force of the closing spring 10. For the embodiment with the leak channel 18, it should be noted that a desired leak stream (average value $Q_L$ in FIG. 6) flows continuously through the valve 1, which is not the case for the embodiment without the leak channel 18. Owing to the two throttling gaps 14 and 15, the volume flow Q there remains close to zero. The size of the leak stream $Q_L$ indicates that the cross section of the flow channel 18 in any case is greater than the cross section of the throttling gap 14.

The product of the pressure p and the area of the circular—apart from the excepted leak channel 18—front surface $A_1$ of the valve body 9 is the first counterforce to the force of the spring 10, which increases with the rising pressure p and pushes the valve body 9 axially in the direction of the valve head 3. The valve 1 here remains initially still closed, but the lengths $L_1$ and $L_2$ by which the first step 9a and the second step 9b of the valve body 9 abut the inner surface 8b of the valve seat 8 are shortened. In this way, both the hydraulic partial resistances of the two throttling gaps 14, 15 and accordingly the total hydraulic resistance decrease slightly, and both curves A, B show an increase, albeit comparatively very small, in the volume flow Q.

Figure 3:
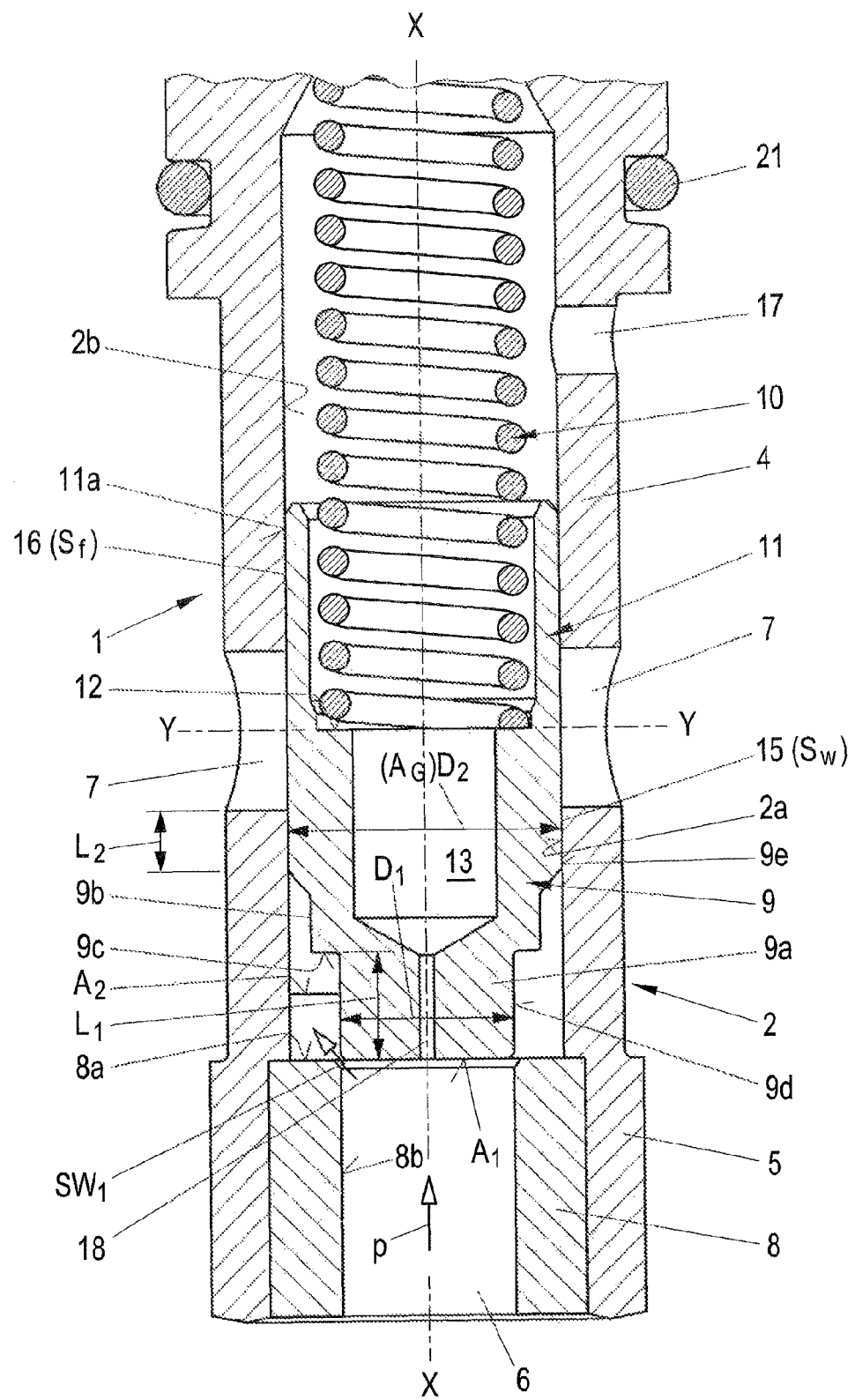
FIGS. 3, 4 and 5 show the valve per FIG. 1, but enlarged and without its housing head in a first, second, and third opening position, in each case effected by a pressure acting at the inlet opening.
Figure 4:
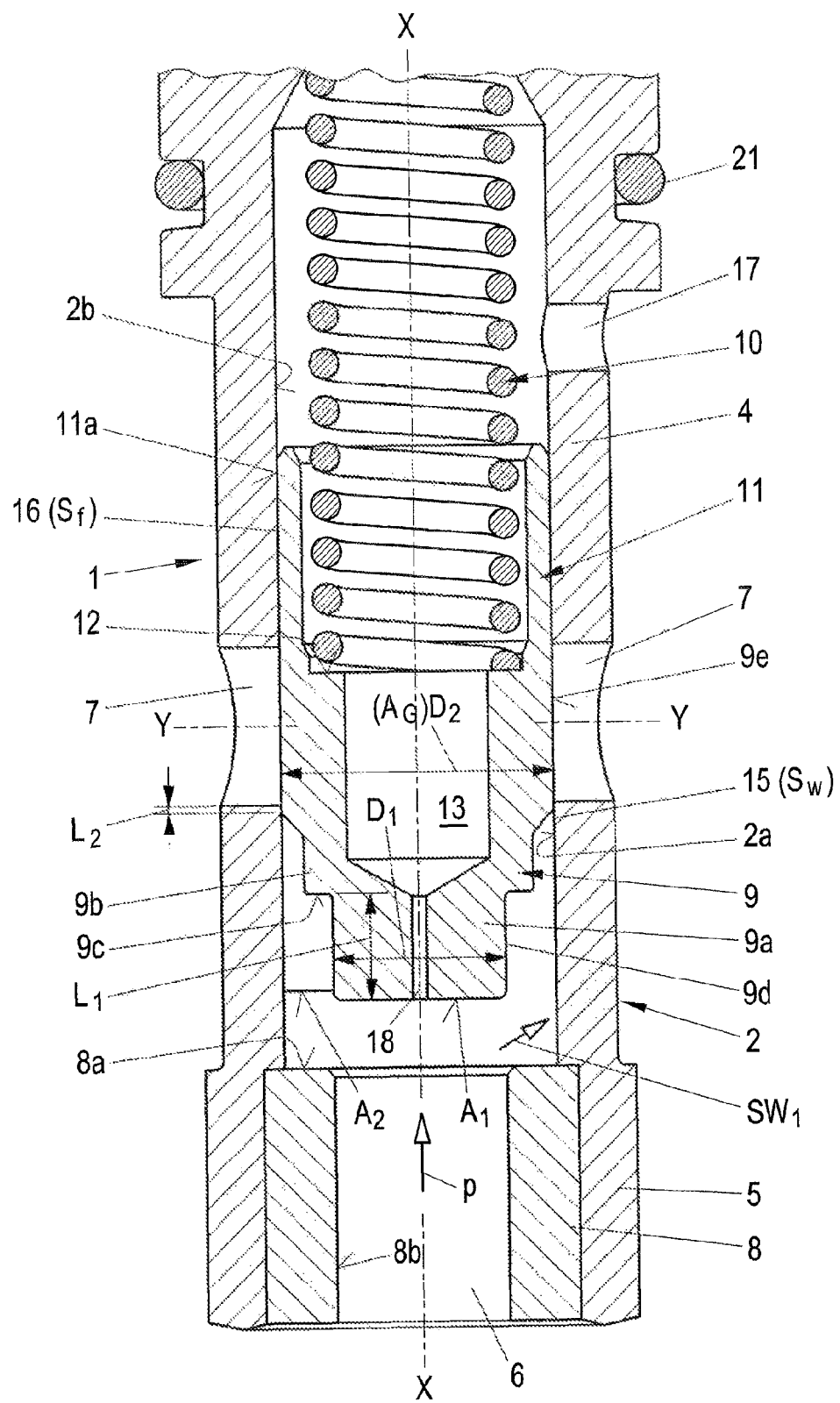

At the moment (first operating points $O_A$ and $O_B$ in FIG. 6) the first step 9a of the valve body 9 emerges from the valve seat 8—see FIG. 3 in this regard—there is an abrupt increase in the volume flow Q in the curves A, B of the Q-p diagram, which is associated with the fact that a flow path is opened between the valve seat 8 and the valve element 9 (arrow $SW_1$ in FIG. 3, 4). The (static) pressure p (values $p_A$ and $p_B$ in FIG. 6) here remains nearly constant, as according to Bernoulli's law, a further pressure increase in the low-pressure system is transformed into kinetic energy.

A cross-section of the flow path $SW_1$ between the valve seat 8 and the valve body 9 here increases relatively quickly during further movement of the valve seat 11, as now the pressure p suddenly acts on the total pressure surface $A_G$ of the valve body 9, resulting in a second counterforce to the force of the spring, which is abruptly larger than the first counterforce even with the pressure p remaining the same.

The relationship between the volume flow Q and the pressure p here can no longer—as it could be initially—be described in terms of the throttling equation of hydraulics, but rather with the so-called aperture formula, according to which the volume flow is proportional to the aperture surface, thus the cross section of the flow path $SW_1$, and to the square root of the pressure drop.

The concepts of "aperture" and "throttle" here stand for idealized system elements, whereby the pressure limiting valve 1 in accordance with the principles of the present invention, in particular due to its variable adjustability, combines the advantageous properties of both system elements.

Insofar as or as long as the total pressure p over the flow path $SW_1$ drops or should drop, this pressure drop is identical to the operating pressure p. In this functional phase of the valve 1—as FIG. 4 also shows—the outlet opening 7 is still closed by the valve piston 11.

The hydraulic partial resistance of the first throttling gap 14 has indeed disappeared, but the hydraulic partial resistance of the second throttling gap 15 is still present, although due to the reduced length of $L_2$, it is smaller in size compared to the initial closed position of the valve 1.

Figure 5:
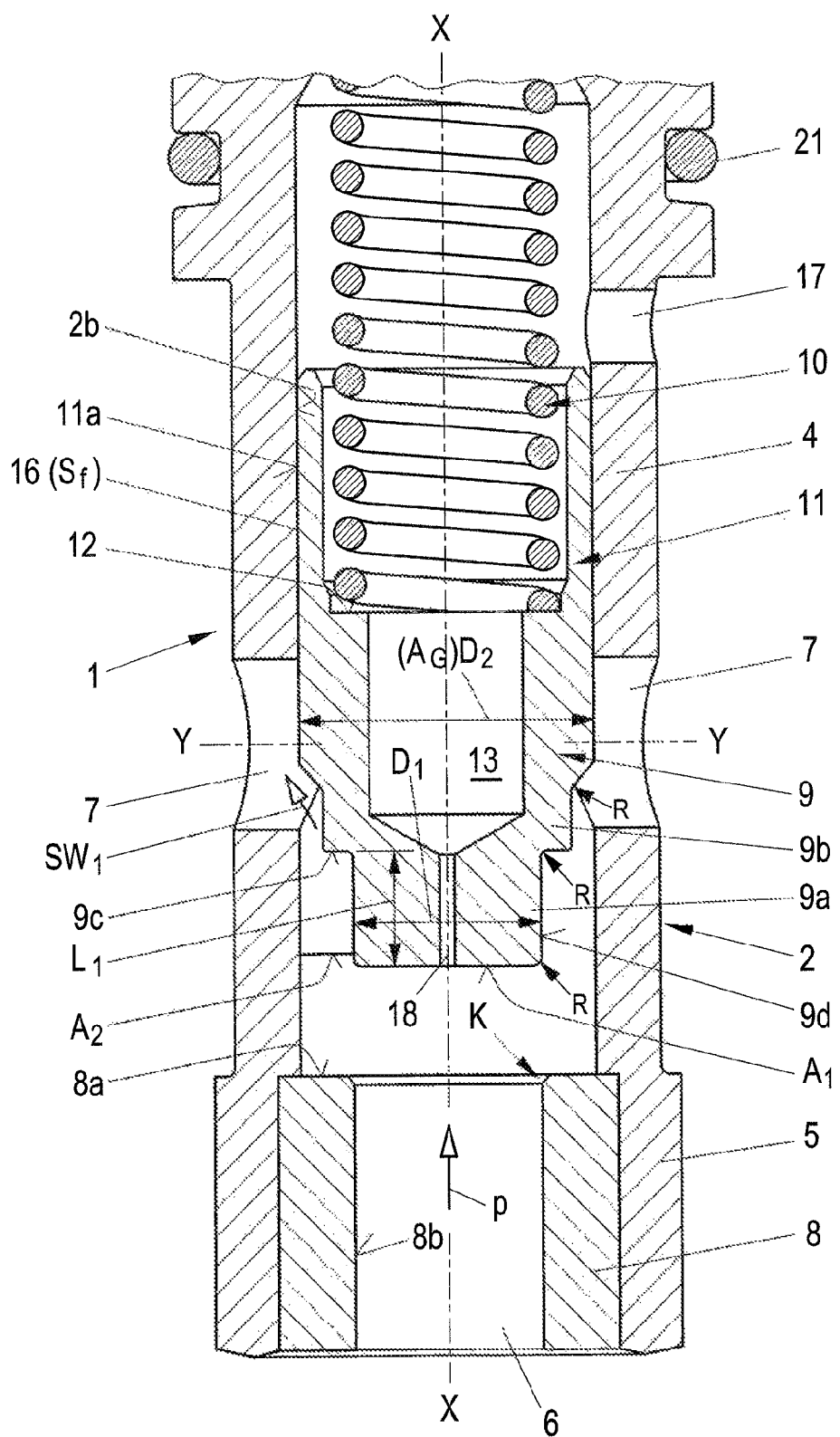

When the valve piston 11, after a further axial displacement in the direction of the head 3, uncovers the outlet opening 7 (second operating points $R_A$, $R_B$ in FIG. 6)—see FIG. 5 in this regard—a kink appears in the curves A, B of the Q-p diagram, which is associated with the fact that a further flow path (arrow $SW_2$ in FIG. 5) opens between the housing jacket 4 and the valve element 9 with successive enlargement of the uncovered cross section of the outlet opening 7.

The rise in the Q-p curves A, B is then less steep, but it still remains much steeper than it was in the phase in which the first step 9b of the valve body 9 was still in the valve seat 8. The relationship between the volume flow Q and pressure p can hereby also be described in this phase with the aperture equation of hydraulics. The hydraulic resistance of an aperture is comparatively much smaller than that of a throttle. The result is that a further pressure increase in the low-pressure system does not lead to a significant static pressure increase, but to an increase in the flow rate, which is equivalent to a higher flow velocity of the medium and thus to a higher portion of kinetic energy.

Conversely, if there is a drop in the volume flow Q to the valve 1, this does not lead immediately to an excessive pressure drop. Up to the operating points $O_A$ and $O_B$, the volume flow Q can fall advantageously by a considerable amount without the pressure p falling to a value of zero. After the pressure limit, which is adjustable by dimensioning of the throttling gap 14, 15, is reached (pressures $p_A$, $p_B$), if desired (curve B) a minimal flow rate can be maintained in the form of the leak flow $Q_L$.

The two curves A and B shown in FIG. 6 here differ not only due to the presence of the leak flow $Q_L$ in the curve B, but also in that the volume flow increase of the curve B occurs only at a higher pressure $p_B$ than is the case with the curve A (pressure $p_A$), and that the transitions at the "jump point" $O_B$ and at the "break point" $R_B$ are advantageously formed less abruptly than in the corresponding operating points $O_A$ and $R_A$ of the other embodiment. This can be achieved by a rounded or minimally conical design of the corresponding parts, for example in the inner and outer edges of the valve element 9 and the valve seat 8 marked with K (for cone) and R (for radius).

The setting of the self-damping and pressure-limiting properties of the valve 1 in accordance with the principles of the present invention can be advantageously influenced by the variably formed throttling point (throttle channel 14) and the modifiable, multistep regulating action. As examples of this, for preferred specific embodiments of the valve 1 in accordance with the teachings of the invention, several more dimensions should be given, naturally without limiting the invention to them.

Depending on an exemplary 5-bar or 7.5-bar version for the maximum pressure, the spring constants of the closing spring 10 can be within the range of 3 N/mm to 5 N/mm.

Depending on the flow requirement, here the surface ratios $A_1$ to $A_G$ can be determined by the fact that the surface $A_1$ that can be acted upon by the pressure is within the range of 18 mm² to 30 mm², while the total pressure surface $A_G$ ranges from 70 mm² to 90 mm². This corresponds to a diameter ratio, selected subject to the flow requirement, of $D_1$ within the range of 4.9 mm to 6.0 mm to $D_2$ within the range of 9.6 mm to 10.6 m, or more generally expressed: $D_1$ to $D_2$=1:(1.6 ... 2.16).

For the first throttling gap 14 here, in particular a gap width $S_d$ can be selected within the range of 0.01 mm to 0.04 mm, which for preferably selected clearances corresponds to around 0.1 mm² to 0.75 mm² of surface. The second throttling gap 15 in the second step 9b of the valve element 9 can preferably feature a gap width $S_w$ within the range of 0.02 mm to 0.09 mm, which for preferably selected clearances corresponds to 0.5 mm² to 1.4 mm² of surface. Applicable in particular here is: $0.1 \leq S_d/S_w \leq 2.0$.

As regards the surface ratio $A_1/A_2$, this should be seen as optimal with respect to a desired control characteristic of the inventive valve 1 when $0.2 \leq A_1/A_2 \leq 0.8$ applies, whereby $A_1$—as explained above—is a circular surface, and $A_2$—as explained above—is an annular surface.

The optimal diameter ratios $D_1/D_2$ both with regard to the embodiment of the throttling gaps 14, 15 and with regard to the pressure surfaces $A_1$, $A_2$, result when $0.4 \leq D_1/D_2 \leq 0.65$.

A ratio $L_1/L_2$ of the lengths $L_1$ and $L_2$ of the throttling gaps 14, 15 must in particular be viewed as optimal when it is true that $0.25 \leq L_1/L_2 \leq 2.0$.

Further, the hydraulic partial resistances of the two throttling gaps 14, 15 are preferably selected in such a way that the requirement of $0.2 \leq \Delta p_2/\Delta p_1 \leq 1.0$ is fulfilled, whereby $\Delta p_1$ is the pressure drop over the first throttling gap 14 and $\Delta p^2$ is the pressure drop over the second throttling gap 15.

The invention is not restricted to the exemplary embodiments shown and described, but also includes all embodiments that produce the same effect in the sense of the invention.

In addition, the person skilled in the art can supplement the pressure limiting valve 1 by further functional technical features without leaving the scope of the teachings of the invention. Thus the embodiment of a pressure limiting valve 1 in accordance with FIG. 7 shows the valve housing 2 configured as a hollow cylindrical screw portion with the threading 19, in which housing's inner space the valve piston 11 is arranged, in which—as described—the closing spring 10, configured as a screw compression spring, is arranged coaxially, and is supported at one end by the rotating piece 12 in the stepped bore of the piston 14. The valve housing 2 is closed in the region of the head 3 in an outwardly pressure-tight manner by a sphere 22 that is received in the housing interior and is secured therein with a non-positive and a positive fit, on which the closing spring 10 is supported by its other end. The pre-tensioning of the spring 10 can be set, with measuring of the spring force, by the corresponding deep compression of the sphere 22 into the interior space of the housing. In this way, a spring tolerance can be balanced, which is important for precise determination of the operating points $O_A$, $O_B$, $R_A$, and $R_B$ of the valve 1. For a spring rate of 3.9 N/mm, for example, tolerances in the range of ±1.5 N/mm can occur. Such values, which can reach a deviation of up to 40%, are also typical for other springs 10. Alternatively, the spring characteristics can also be determined in a first process step, so that subsequently, in a second process step, after placement of the spring 10 in the housing, the sphere 22 can be fixed at the corresponding depth with a seal seat in the housing head 3.

Different Q-p curves are possible within the range of the length ratios indicated as optimal, of $0.25 \leq L_1/L_2 \leq 2.0$ for the throttling gaps 14, 15, depending on which design can be structured in the desired manner. Thus with regard to the length ratios of the throttling gaps 14, 15, three different basic variants of design and functional mode may be derived. In the first case, which is illustrated in the drawing, in which the second throttling gap 15 is wider than the first throttling gap 14, the second gap 15 is still retained and acts with throttling effect when the first gap 14 is no longer effective (FIG. 3). However, insofar as, with the ensuing aperture action, this involves an aperture with a variable opening width between the valve seat 8 and the spring-loaded valve body 9, there is no Q-p-curve that must be deemed significant for an aperture, but rather an approximately linear progression of Q(p). In the second instance, when both throttling gaps 14, 15 are equally long, when the valve is opened, the relevance of the throttling properties of both gaps 14, 15 diminishes to the same extent, and their throttling effects disappear simultaneously, so that here too the aperture effects appear simultaneously. Ultimately, with a fully opened valve, the size of the outlet opening 7 will preferably constitute a limitation of the maximal outflow cross section. In the third instance, when the first throttling gap 14 is longer than the second throttling gap 15, the first gap 14 is retained and has a throttling action when the second gap is no longer effective. In the three instances, a different separation can occur respectively between the axial end of the first throttling gap 14 and the start of the second throttling gap 15. By minimizing this separation, axial installation space can be saved, or better use of the axial installation length of the inventive valve 1 can be advantageously achieved.

Furthermore, thus far the invention is not yet limited to the feature combination defined the specific embodiments set out herein, but can also be defined by any other arbitrary combination of specific features of all generally disclosed individual features. This means that fundamentally practically any individual feature of one embodiment may be discarded or can be replaced by at least one individual feature disclosed at another point in the application.

List Of Referenced Elements 1 spring
2 housing of 1
2a inner surface of 4 (in correlation with 9)
2b inner surface of 4 (in correlation with 11)
3 housing head of 2
4 housing jacket of 2
5 housing base of 2
6 inlet opening of 1
7 outlet opening of 1
8 valve seat of 1
8a inner front surface of 8
9 valve body
9a first step of 9
9b second step of 9
9c piece in 9, step 9a/9b
9d outer surface of 9 in region of 9a
9e outer surface of 9 in region of 9b
10 closing spring
11 valve piston (single piece with 9)
11 an outer surface of 11 in region of 16
12 piece in 11
13 blind hole in 11
14 throttling gap between 8 and 9
15 peripheral gap between 4 and 9
16 peripheral gap between 4 and 11
17 relief opening in 4
18 leak channel in 9
19 outer threading of 1
20 force application of 1
21 peripheral seal
22 sphere in 4 in region of 3
A curve in FIG. 6, embodiment of 1 without 18 in 9
$A_1$ first cross sectional surface of 9 (in 9a) that may be acted upon by pressure
$A_2$ second cross sectional surface of 9 (in 9b) that may be acted upon by pressure
$A_G$ total pressure surface of 9 (total cross sectional surface)
B curve in FIG. 6, embodiment of 1 with 18 in 9
$D_1$ diameter of 9 in 9a
$D_2$ diameter of 9 at 9b
K cone of 8 (FIG. 1)
$L_1$ length of 14 (first length)
$L_2$ length of 15 (second length)
$O_A$ first operating point of A, jump point of Q
$O_B$ first operating point of B, jump point of Q
$R_A$ second operating point of A, break point of Q
$R_B$ second operating point of B, break point of Q
p pressure
$p_A$ pressure at $O_A$
$p_B$ pressure at $O_B$
Q volume flow per time unit through 1
$Q_L$ leak flow through 1

R radii at 9 (FIG. 1)
$S_d$ gap width of 14
$S_f$ gap width of 16
$S_w$ gap width of 15
$SW_1$ flow path between 8 and 9
$SW_2$ flow path between 9 and 4 through 7
X-X longitudinal axis of 1
Y-Y transverse axis of 1 through 7

The invention claimed is:

1. A pressure limiting valve for arrangement in a return pipe of a common-rail system of an internal combustion engine, the pressure limiting valve comprising a valve housing having a housing head and a hollow cylindrical housing jacket that contains, in a valve base of the valve housing, an inlet opening and axially separated from the inlet opening at least one outlet opening, whereby an inner valve seat for a valve body is attached to the inlet opening in the valve base, and whereby an axially mobile valve piston is arranged between the valve seat and a closing spring, which produces a closing force against a pressure acting at the inlet opening, wherein the valve body is of a stepped configuration, which in a first step on a side facing the inlet opening features a first surface ($A_1$), which is acted upon in the axial direction with the pressure (p), as well as a first axial length ($L_1$), over which the valve body forms in a closed position with an outer surface of the valve body a first peripheral throttling gap with an inner surface of the valve seat, and which in a second step forms a second surface ($A_2$), which is acted upon in the axial direction (X-X) with the pressure (p), which together with the first surface ($A_1$) forms a total pressure surface ($A_G$), whereby in the second step a second peripheral throttling gap with a second gap width ($S_W$) is formed between an outer surface of the valve body and an inner surface of the housing jacket over a second axial length ($L_2$), the first peripheral throttling gap and the second peripheral throttling gap providing a hydraulic damping effect on movement of valve body during closing of the pressure limiting valve, wherein the second peripheral throttling gap formed in the second step of the valve body between the outer surface of the valve body and the inner surface of the housing jacket forms a smaller gap width ($S_W$) than a gap width ($S_d$) of the first peripheral throttling gap.

2. Pressure limiting valve in accordance with claim 1, wherein a ratio of the gap width ($S_d$) of the first peripheral throttling gap to the gap width ($S_W$) of the second peripheral throttling gap is in the range of $0.1 \leq S_d/S_W \leq 2.0$.

3. Pressure limiting valve in accordance with claim 1, wherein a ratio of the length ($L_1$) of the first peripheral throttling gap to the length ($L_2$) of the second peripheral throttling gap is in the range of $0.25 \leq L_1/L_2 \leq 2.0$.

4. Pressure limiting valve in accordance with claim 1, wherein a ratio of a first diameter ($D_1$) defined by the first peripheral throttling gap to a second diameter ($D_2$) defined by the second peripheral throttling gap is in the range of $0.40 \leq D_1/D_2 \leq 0.65$.

5. Pressure limiting valve in accordance with claim 1, wherein the first axial length ($L_1$) and the second axial length ($L_2$), a first diameter ($D_1$) defined by the first peripheral throttling gap, and a second diameter ($D_2$) defined by the second peripheral throttling gap, and the first gap width ($S_d$) and a second gap width ($S_W$) of the first peripheral throttling and the second peripheral throttling gap result in a hydraulic partial resistance effected by the second peripheral throttling gap that is smaller than a hydraulic partial resistance effected by the first peripheral throttling gap.

6. Pressure limiting valve in accordance with claim 1, wherein a ratio of a pressure drop over the second peripheral throttling gap ($\Delta p_2$) to a pressure drop over the first peripheral throttling gap ($\Delta p_1$) is in the range of $0.2 \leq \Delta p_2/\Delta p_1 \leq 2.0$.

7. Pressure limiting valve in accordance with claim 1, wherein a surface ratio ($A_1/A_2$) of the first surface ($A_1$) that is acted upon by pressure to the second surface ($A_2$) that is acted upon by pressure of the valve piston lies within a range of $0.2 \leq A_1/A_2 \leq 0.8$.

8. Pressure limiting valve in accordance with claim 1, wherein the at least one outlet opening is arranged as a radial opening in the housing jacket of the valve housing, whereby the valve piston uncovers the at least one outlet opening in an open position at least regionally in the direction of the inlet opening and covers the at least one outlet opening in slide-like fashion in a closed position.

9. Pressure limiting valve in accordance with claim 1, wherein the valve seat is formed by an annular insert piece secured in the valve housing, and wherein the valve body cooperates to define the first peripheral throttling gap.

10. Pressure limiting valve in accordance with claim 1, wherein the valve housing is configured as a hollow screw with an outer threading and a force application member for a turning tool located axially opposite the inlet opening, and is configured with an outside peripheral seal.

11. Pressure limiting valve in accordance with claim 1, wherein the closing spring is configured as a screw compression spring, which on one end is supported on a shoulder of the valve piston and on the other end is supported on a sphere that is secured in a non-positive and a positive manner on the inside of the housing.

12. Pressure limiting valve in accordance with claim 1, further comprising a leak passage for ventilation and/or maintenance of a required leak volume stream.

13. Pressure limiting valve in accordance with claim 12, wherein the leak passage is provided as an outer bypass pipe.

14. Pressure limiting valve in accordance with claim 12, wherein the leak passage is provided as a leak channel that can be acted upon in the axial direction with the pressure (p).

15. Pressure limiting valve in accordance with claim 14, wherein the leak passage is provided a through bore through the first surface of the valve body.

* * * * *